(12) United States Patent
Lawler et al.

(10) Patent No.: US 7,373,935 B2
(45) Date of Patent: May 20, 2008

(54) CARBIDE WIRE BLADE

(75) Inventors: Kinton Lawler, Fulshear, TX (US);
John Davis, Magnolia, TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 11/495,309

(22) Filed: Jul. 28, 2006

(65) Prior Publication Data

US 2008/0022991 A1 Jan. 31, 2008

(51) Int. Cl.
*B28D 1/08* (2006.01)

(52) U.S. Cl. .................. 125/22; 125/16.02; 125/21

(58) Field of Classification Search .............. 125/15, 125/21, 22, 12, 16.02, 16.01; 83/651.1, 661
See application file for complete search history.

(56) References Cited

U.S. PATENT DOCUMENTS

| | | | |
|---|---|---|---|
| 2,679,839 A * | 6/1954 | Metzger | ............. 125/21 |
| 3,376,907 A | 4/1968 | McNeal | |
| 3,479,830 A | 11/1969 | Ostarly | |
| 3,598,101 A * | 8/1971 | Hensley | ............. 125/21 |
| 3,667,515 A | 6/1972 | Corey | |
| 4,109,480 A | 8/1978 | Sumner | |
| 4,143,862 A | 3/1979 | Krieg | |
| 4,168,729 A | 9/1979 | Tausig et al. | |
| 4,180,047 A | 12/1979 | Bertelson | |
| 4,230,462 A | 10/1980 | Moskowitz | |
| 4,366,254 A | 12/1982 | Rich et al. | |
| 5,042,959 A | 8/1991 | Tadatsu | |
| 5,361,748 A | 11/1994 | Matteucci | |
| 5,868,182 A | 2/1999 | Burton | |
| 6,267,037 B1 | 7/2001 | McCoy, Jr. et al. | |
| 6,447,896 B1 | 9/2002 | Augustine | |
| 6,789,587 B2 | 9/2004 | Mossman et al. | |
| 7,036,599 B2 | 5/2006 | Matteucci | |
| 2003/0140915 A1 * | 7/2003 | Tommasini | ............. 125/21 |

FOREIGN PATENT DOCUMENTS

| | | | |
|---|---|---|---|
| DE | 2545347 | * | 4/1977 |
| DE | 3148065 | * | 7/1982 |
| FR | 907347 | * | 3/1946 |
| FR | 1203000 | * | 1/1960 |
| GB | 644726 | * | 10/1950 |
| IT | 718311 | * | 10/1966 |
| JP | 5-4223 | * | 1/1993 |

* cited by examiner

*Primary Examiner*—Robert Rose
(74) *Attorney, Agent, or Firm*—Duane Morris LLP

(57) ABSTRACT

This invention relates to a carbide wire blade that is suitable for use in sawing through subsea structures. The carbide wire blade employs a tungsten carbide cutter, a vibration dampening member, and the first cylindrical spacer, slideably mounted on a solid cylindrical body.

21 Claims, 2 Drawing Sheets

CARBIDE WIRE BLADE

FIELD OF INVENTION

This invention relates to a carbide wire blade that is suitable for use in sawing through subsea structures. The carbide wire blade employs a tungsten carbide cutter, a vibration dampening member, and the first cylindrical spacer, slideably mounted on a solid cylindrical body.

BACKGROUND OF THE INVENTION

Diamond wire saws have been used to cut through subsea structures such as fixed platform legs. A prior art diamond wire saw is disclosed in U.S. Pat. No. 7,036,599 to Matteucci. Subsea structures are made of a variety of materials, including metallic and nonmetallic materials. Nonmetallic materials used in subsea structures include various polymer compounds.

A drawback of diamond wire saws is that their diamond wire blades become clogged and thereby lose their cutting efficiency when used to cut certain polymer based materials. An invention comprising a carbide wire blade, of the type disclosed herein maintains its cutting efficiency when used to cut structures having a polymer composition.

DETAILED DESCRIPTION OF THE PREFERRED EMBODIMENTS

Figure 1:
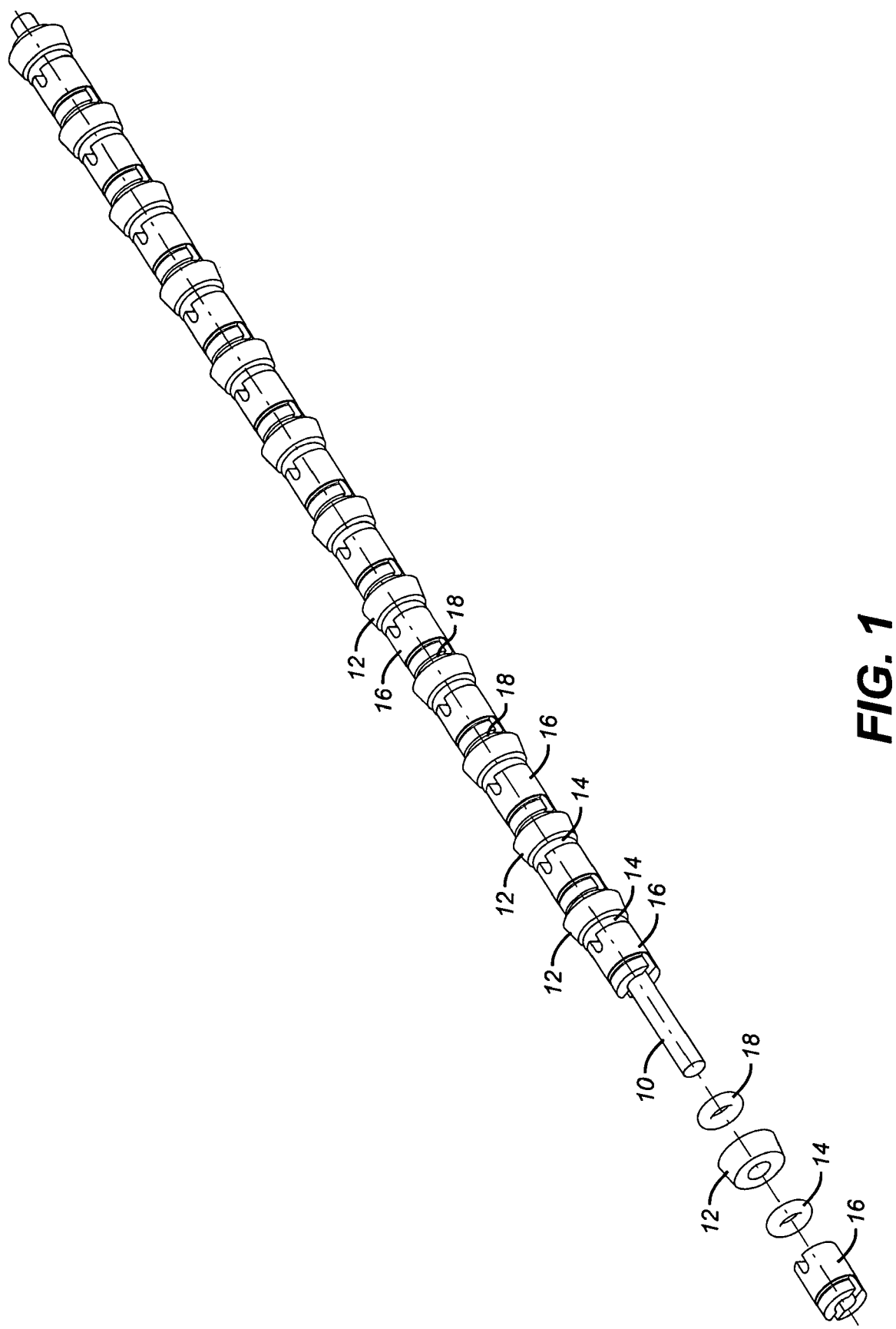
FIG. 1 is an isometric view of one preferred embodiment of the invention.
Figure 2:
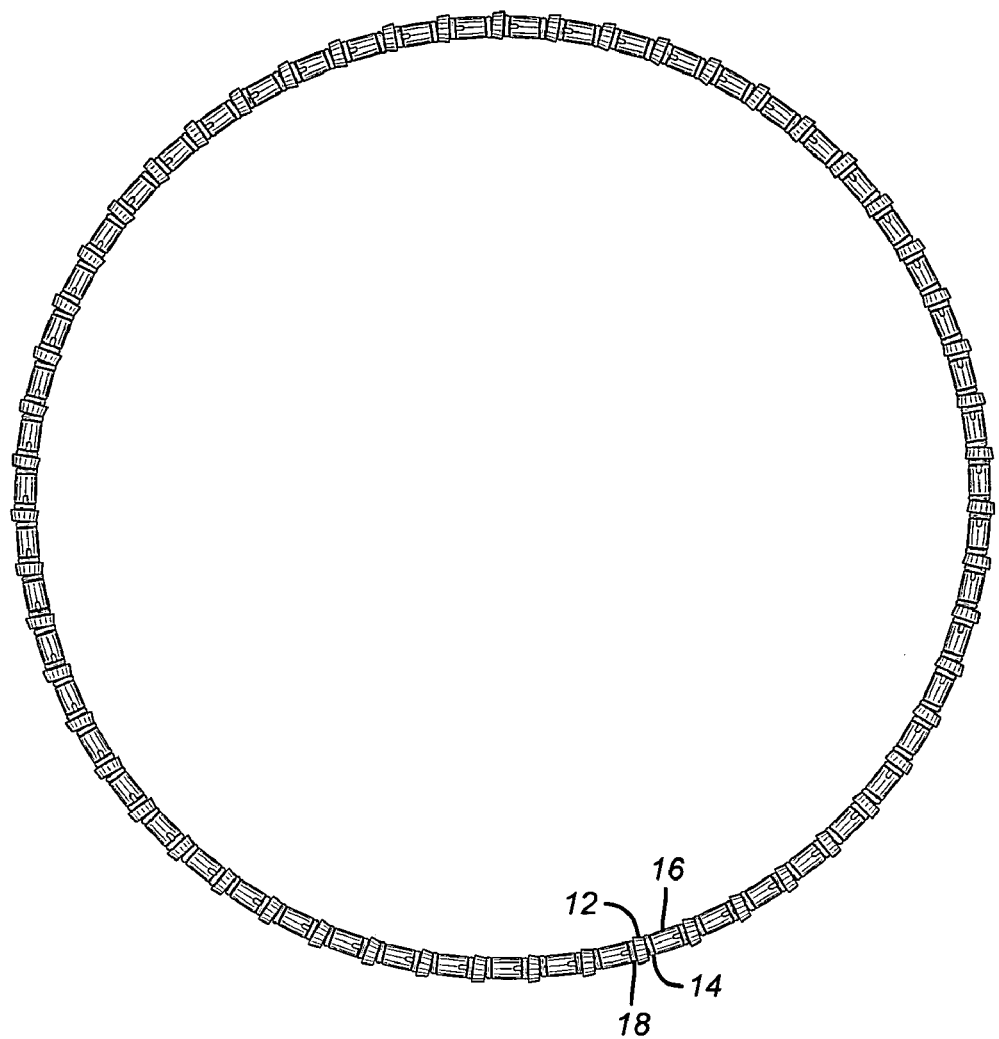
FIG. 2 is a top view of another preferred embodiment of the invention comprising a loop body configuration.

A first preferred embodiment of the present invention is a carbide wire blade comprising a solid cylindrical metallic body 10 comprising a first end, a second end, and an outer surface having an outer diameter, OD1, as shown in FIG. 1. In one preferred embodiment, the first end of the body is connected to the second end of the body, as shown in FIG. 2. In another preferred embodiment, the body forms a loop, as shown in FIG. 2.

Figure 3:
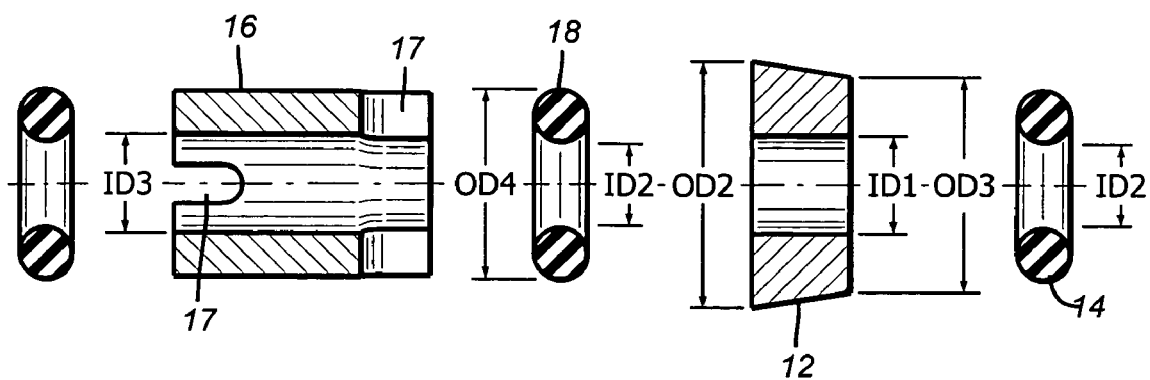
FIG. 3 is a side cut away view of components of a preferred embodiment of the invention.

This first preferred embodiment further comprises a first tungsten carbide cutter 12 slideably mounted on the body 10 and comprising a central longitudinal channel extending the entire length of the first cutter and having an inner diameter, ID1, sized to slideably fit over the body, as shown in FIGS. 1 and 3. The first cutter further comprises a distal end region comprising a cuffing lip having an outer diameter, 0D2, and a proximal end region having an outer diameter, 0D3, that is less than 0D2, such that the outer surface of The first cutter forms an angle with respect to the outer surface of the body in the range of 1° to 45°, as shown in FIG. 3. In one preferred embodiment, the cutter comprises sintered tungsten carbide. As shown in the preferred embodiment of FIG. 3, the outer surface of the first cutter forms a substantially constant angle with respect to the outer surface of the body in the range of 1° to 45°.

This first preferred embodiment further comprises a first vibration dampening member 14 slideably mounted on the body 10 and positioned adjacent the proximal end of the first cutter and having an inner diameter, ID2, substantially equivalent to ID1, and an outer diameter, OD4, that is greater than ID2 and less than or equal to OD3, as shown in FIG. 3. In one preferred embodiment, the vibration dampening member is made from an elastomeric material, as shown in FIG. 1. In another preferred embodiment, the vibration dampening member is an O-ring, as shown in FIG. 1.

This first preferred embodiment further comprises a first spacer 16 slideably mounted on the body 10 and comprising a distal end adjacent the first dampening member and a proximal end opposite the distal end, as shown in FIG. 1. The spacer comprises a central longitudinal passageway extending the entire length of the spacer and having an inner diameter, ID3, sized to slideably fit over the body, as shown in FIG. 3. The first spacer has a length in the range of ⅛ to ⅝ inches. In a preferred embodiment, the first spacer is cylindrical, as shown in FIGS. 1 and 3.

In a preferred embodiment, the invention further comprises a distal vibration dampening member 18 adjacent the distal end of the first cutter and slideably mounted on body 10, as shown in FIG. 1. The second vibration dampening member has an inner diameter, ID2, substantially equivalent to ID1, and an outer diameter, OD4, that is greater than ID2 and less than or equal to OD3, as shown in FIG. 3.

A second preferred embodiment of the invention comprises all of the elements of the first preferred embodiment of the invention as well as a second tungsten carbide cutter 12 slideably mounted on the body 10 and comprising a central longitudinal channel extending the entire length of the second cutter and having an inner diameter, ID1, sized to slideably fit over the body. The second cutter further comprising a distal end region comprising a cutting lip having an outer diameter, OD2, and a proximal end region having an outer diameter, OD3, that is less than OD2, such that the outer surface of the second cutter forms an angle with respect to the outer surface of the body in the range of 1° to 45°. The second cutter is positioned such that its distal end region is adjacent the proximal end of the first spacer.

The second preferred embodiment further comprises a second vibration dampening member 14 slideably mounted on the body 10 and positioned adjacent the proximal end of the second cutter. The second vibration dampening member has an inner diameter, ID2, substantially equivalent to ID1, and an outer diameter, OD4, that is greater than ID2 and less than or equal to OD3, shown in FIGS. 1-3.

The second preferred embodiment further comprises a second spacer 16 slideably mounted on the body 10 and comprising a distal end adjacent the second dampening member and a proximal end opposite the distal end. The second spacer comprises a central longitudinal passageway extending the entire length of the spacer and having an inner diameter, ID3, sized to slideably fit over the body. The second spacer has a length in the range of ⅛ to ⅝ inches. In a preferred embodiment, the second spacer is cylindrical.

A third preferred embodiment of the invention comprises all of the elements of the second preferred embodiment of the invention as well as a third tungsten carbide cutter 12 slideably mounted on the body 10 and comprising a central longitudinal channel extending the entire length of the third cutter and having an inner diameter, ID), sized to slideably fit over the body, shown in FIGS. 1-3. The third cutter further comprising a distal end region comprising a cutting lip having an outer diameter, OD2, and a proximal end region having an outer diameter, OD3, that is less than OD2, such that the outer surface of the third cutter forms an angle with respect to the outer surface of the body in the range of 1° to 45°. The third cutter is positioned such that its distal end region is adjacent the proximal end of the second spacer.

The third preferred embodiment further comprises a third vibration dampening member 14 slideably mounted on the body 10 and positioned adjacent the proximal end of the third cutter. The third vibration dampening member has an inner diameter, ID2, substantially equivalent to ID1, and an outer diameter, OD4, that is greater than ID2 and less than or equal to OD3, shown in FIGS. 1-3.

The third preferred embodiment further comprises a third spacer 16 slideably mounted on the body 10 and comprising a distal end adjacent the second dampening member and a proximal end opposite the distal end, as shown in FIGS. 1-3. The third spacer comprises a central longitudinal passageway extending the entire length of the spacer and having an inner diameter, ID3, sized to slideably fit over the body. The third spacer has a length in the range of ⅛ to ⅝ inches. In a preferred embodiment, the third spacer is cylindrical.

In another preferred embodiment, each of the above described vibration dampening members is an O-ring, as shown in FIGS. 1 and 3. In another preferred embodiment, each of the above described dampening members is elastomeric.

In another preferred embodiment, each of the above described cutters comprises sintered tungsten carbide.

In another preferred embodiment, each of the above described spacers is cylindrical and comprises at least one slot 17 in its proximal end and at least one slot, 17 in its distal end.

The combination of a tungsten carbide cutter which is adjacent to a vibration dampening member which is adjacent to a spacer, all of which are slideably mounted on a body, as described above, is hereinafter referred to as a "cutter/dampening member/spacer combination." A multiplicity of these cutter/dampening member/spacer combinations may be slideably mounted on body 10 to increase the length of the carbide wire blade as needed for a particular cutting application, as shown in FIGS. 1 and 2.

By way of example, a fourth preferred embodiment to the present invention comprises six cutter/dampening member/spacer combinations slideably mounted on a body to form a cutting blade, having the structural configuration described above, as shown in FIGS. 1 and 2. This embodiment may further comprise a distal elastomeric vibration dampening member 18 slideably mounted on the body 10 and placed between the distal end of each cutter and the proximal end of each spacer. In another preferred embodiment, each of the spacers is cylindrical, as shown in FIGS. 1 and 3.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A carbide wire blade comprising:
   a. a solid cylindrical metallic body comprising a first end, a second end, and an outer surface having an outer diameter, OD1;
   b. a first tungsten carbide cutter slideably mounted on the body and comprising a central longitudinal channel extending the entire length of the first cutter and having an inner diameter, ID1, sized to slideably fit over the body, said first cutter further comprising a distal end region comprising a cutting lip having an outer diameter, OD2, and a proximal end region having an outer diameter, 0D3, that is less than OD2, such that the outer surface of the first cutter forms an angle with respect to the outer surface of the body in the range of 1° to 45°;
   c. a first vibration dampening member slideably mounted on the body and positioned adjacent the proximal end of the first cutter and having an inner diameter, ID2, substantially equivalent to ID1, and an outer diameter, OD4, that is greater than ID2 and less than or equal to OD3; and
   d. a first spacer slideably mounted on the body and comprising a distal end adjacent the first dampening member, said distal end comprising at least one slot, and a proximal end opposite the distal end, said proximal end comprising at least one slot, said spacer comprising a central longitudinal passageway extending the entire length of the spacer and having an inner diameter, ID3, sized to slideably fit over the body, said first spacer having a length in the range of ⅛ to ⅝ inches.

2. The carbide wire blade of claim 1, wherein the first end of the body is connected to the second end of the body.

3. The carbide wire blade of claim 2, wherein the body forms a loop.

4. The carbide wire blade of claim 1, wherein the vibration dampening member is made from an elastomeric material.

5. The carbide wire blade of claim 4, wherein the vibration dampening member is an O-ring.

6. The carbide wire blade of claim 1, wherein the cutter comprises sintered tungsten carbide.

7. The carbide wire blade of claim 1, further comprising a distal vibration dampening member adjacent the distal end of the first cutter and having an inner diameter, ID2, substantially equivalent to ID1, and an outer diameter, OD4, that is greater than ID2 and less than or equal to OD3.

8. The carbide wire blade of claim 3, further comprising:
   a. a second tungsten carbide cutter slideably mounted on the body and comprising a central longitudinal channel extending the entire length of the second cutter and having an inner diameter, ID1, sized to slideably fit over the body, said second cutter further comprising a distal end region comprising a cutting lip having an outer diameter, OD2, and a proximal end region having an outer diameter, OD3, that is less than OD2, such that the outer surface of the second cutter forms an angle with respect to the outer surface of the body in the range of 1° to 45°, said second cutter being positioned such that its distal end region is adjacent the proximal end of the first spacer;
   b. a second vibration dampening member slideably mounted on the body and positioned adjacent the proximal end of the second cutter and having an inner diameter, ID2, substantially equivalent to ID1, and an outer diameter, OD4, that is greater than ID2 and less than or equal to OD3; and
   c. a second spacer slideably mounted on the body and comprising a distal end adjacent the second dampening member and a proximal end opposite the distal end, said spacer comprising a central longitudinal passageway extending the entire length of the spacer and having an inner diameter, ID3, sized to slideably fit over the body, said second spacer having a length in the range of ⅛ to ⅝ inches.

9. The carbide wire blade of claim 8, further comprising:
   a. a third tungsten carbide cutter slideably mounted on the body and comprising a central longitudinal channel extending the entire length of the second cutter and having an inner diameter, ID1, sized to slideably fit over the body, said third cutter further comprising a distal end region comprising a culling lip having an outer diameter, OD2, and a proximal end region having an outer diameter, OD3, that is less than OD2, such that the outer surface of the third cutter forms an angle with respect to the outer surface of the body in the range of 1° to 45°, said third cutter being positioned such that its distal end region is adjacent the proximal end of the second spacer;

b. a third vibration dampening member slideably mounted on the body and positioned adjacent the proximal end of the third cutter and having an inner diameter, ID2, substantially equivalent to ID1, and an outer diameter, OD4, that is greater than ID2 and less than or equal to OD3; and c. a third spacer slideably mounted on the body and comprising a distal end adjacent the third dampening member and a proximal end opposite the distal end, said spacer comprising a central longitudinal passageway extending the entire length of the spacer and having an inner diameter, ID3, sized to slideably fit over the body, said third spacer having a length in the range of ⅛ to ⅝ inches.

10. The carbide wire blade of claim 9, wherein the vibration dampening member is an O-ring.

11. The carbide wire blade of claim 9, wherein each cutter comprises sintered tungsten carbide.

12. The carbide wire blade of claim 9, farther comprising a second vibration dampening member adjacent the distal end of the first cutter and having an inner diameter, ID2, substantially equivalent to ID1, and an outer diameter, OD4, that is greater than ID2 and less than or equal to OD3.

13. The carbide wire blade of claim 9, wherein each spacer is cylindrical.

14. A carbide wire blade comprising:
a. a solid cylindrical metallic body forming a loop and comprising an outer surface having an outer diameter, OD1;
b. a first tungsten carbide cutter slideably mounted on the body and comprising a central longitudinal channel extending the entire length of the first cutter and having an inner diameter, ID1, sized to slideably fit over the body, said first cutter further comprising a distal end region comprising a cutting lip having an outer diameter, OD2, and a proximal end region having an outer diameter, OD3, that is less than OD2, such that the outer surface of the first cutter forms an angle with respect to the outer surface of the body in the range of 1° to 45°;
c. a first elastomeric vibration dampening member slideably mounted on the body and positioned adjacent the proximal end of the first cutter and having an inner diameter, ID2, substantially equivalent to ID1, and an outer diameter, OD4, that is greater than ID2 and less than or equal to OD3;
d. a first cylindrical spacer slideably mounted on the body and comprising a distal end adjacent the first dampening member and a proximal end opposite the distal end, said spacer comprising a central longitudinal passageway extending the entire length of the spacer and having an inner diameter, ID3, sized to slideably fit over the body, said first spacer having a length in the range of ⅛ to ⅝ inches, said spacer comprising at least one slot in each of its distal and proximal ends;
e. a second tungsten carbide cutter slideably mounted on the body and comprising a central longitudinal channel extending the entire length of the second cutter and having an inner diameter, ID1, sized to slideably fit over the body, said second cutter further comprising a distal end region comprising a cutting lip having an outer diameter, OD2, and a proximal end region having an outer diameter, OD3, that is less than OD2, such that the outer surface of the second cutter forms an angle with respect to the outer surface of the body in the range of 1° to 45°, said second cutter being positioned such that its distal end region is adjacent the proximal end of the first spacer;
f. a second elastomeric vibration dampening member slideably mounted on the body and positioned adjacent the proximal end of the second cutter and having an inner diameter, ID2, substantially equivalent to ID1, and an outer diameter, OD4, that is greater than ID2 and less than or equal to OD3; and
g. a second cylindrical spacer slideably mounted on the body and comprising a distal end adjacent the second dampening member and a proximal end opposite the distal end, said spacer comprising a central longitudinal passageway extending the entire length of the spacer and having an inner diameter, ID3, sized to slideably fit over the body, said second spacer having a length in the range of ⅛ to ⅝ inches, said spacer comprising at least one slot in each of its distal and proximal ends.

15. The carbide wire blade of claim 14, wherein each cutter comprises sintered tungsten carbide.

16. The carbide wire blade of claim 15, further comprising a distal elastomeric vibration dampening member slideably mounted on the body and placed between the distal end of each cutter and the proximal end of each spacer.

17. The carbide wire blade of claim 14, wherein each vibration dampening member is toroidal.

18. A carbide wire blade comprising:
a. a solid cylindrical metallic body forming a loop and comprising an outer surface having an outer diameter, OD1;
b. a first tungsten carbide cutter slideably mounted on the body and comprising a central longitudinal channel extending the entire length of the first cutter and having an inner diameter, ID1, sized to slideably fit over the body, said first cutter further comprising a distal end region comprising a cutting lip having an outer diameter, OD2, and a proximal end region having an outer diameter, OD3, that is less than OD2, such that the outer surface of the first cutter forms an angle with respect to the outer surface of the body in the range of 1° to 45°;
c. a first elastomeric vibration dampening member slideably mounted on the body and positioned adjacent the proximal end of the first cutter and having an inner diameter, ID2, substantially equivalent to ID1, and an outer diameter, OD4, that is greater than ID2 and less than or equal to OD3;
d. a first cylindrical spacer slideably mounted on the body and comprising a distal end adjacent the first dampening member and a proximal end opposite the distal end, said spacer comprising a central longitudinal passageway extending the entire length of the spacer and having an inner diameter, ID3, sized to slideably fit over the body, said first spacer having a length in the range of ⅛ to ⅝ inches, said spacer comprising at least one slot in each of its distal and proximal ends;
e. a second tungsten carbide cutter slideably mounted on the body and comprising a central longitudinal channel extending the entire length of the second cutter and having an inner diameter, ID1, sized to slideably fit over the body, said second cutter further comprising a distal end region comprising a cuffing lip having an outer diameter, OD2, and a proximal end region having an outer diameter, OD3, that is less than OD2, such that the outer surface of the second cutter forms an angle with respect to the outer surface of the body in the range of 1° to 45°, said second cutter being positioned such that its distal end region is adjacent the proximal end of the first spacer;

f. a second elastomeric vibration dampening member slideably mounted on the body and positioned adjacent the proximal end of the second cutter and having an inner diameter, ID2, substantially equivalent to ID1, and an outer diameter, OD4, that is greater than ID2 and less than or equal to OD3;

g. a second cylindrical spacer slideably mounted on the body and comprising a distal end adjacent the second dampening member and a proximal end opposite the distal end, said spacer comprising a central longitudinal passageway extending the entire length of the spacer and having an inner diameter, ID3, sized to slideably fit over the body, said second spacer having a length in the range of ⅛ to ⅝ inches, said spacer comprising at least one slot in each of its distal and proximal ends;

h. a third tungsten carbide cutter slideably mounted on the body and comprising a central longitudinal channel extending the entire length of the second cutter and having an inner diameter, ID1, sized to slideably fit over the body, said third cutter further comprising a distal end region comprising a cuffing lip having an outer diameter, OD2, and a proximal end region having an outer diameter, OD3, that is less than OD2, such that the outer surface of the third cuffer forms an angle with respect to the outer surface of the body in the range of 1° to 45°, said third cutter being positioned such that its distal end region is adjacent the proximal end of the second spacer;

i. a third elastomeric vibration dampening member slideably mounted on the body and positioned adjacent the proximal end of the third cutter and having an inner diameter, ID2, substantially equivalent to ID1, and an outer diameter, OD4, that is greater than ID2 and less than or equal to OD3; and j. a third cylindrical spacer slideably mounted on the body and comprising a distal end adjacent the third dampening member and a proximal end opposite the distal end, said spacer comprising a central longitudinal passageway extending the entire length of the spacer and having an inner diameter, ID3, sized to slideably fit over the body, said third spacer having a length in the range of ⅛ to ⅝ inches, said spacer comprising at least one slot in each of its distal and proximal ends.

19. The carbide wire blade of claim 18, further comprising:

a a fourth tungsten carbide cutter slideably mounted on the body and comprising a central longitudinal channel extending the entire length of the fourth cutter and having an inner diameter, ID1, sized to slideably fit over the body, said fourth cutter further comprising a distal end region comprising a cutting lip having an outer diameter, OD2, and a proximal end region having an outer diameter, OD3, that is less than OD2, such that the outer surface of the fourth cutter forms an angle with respect to the outer surface of the body in the range of 1° to 45°, said fourth cutter being positioned such that its distal end region is adjacent the proximal end of the third spacer;

b. a fourth elastomeric vibration dampening member slideably mounted on the body and positioned adjacent the proximal end of the fourth cutter and having an inner diameter, ID2, substantially equivalent to ID1, and an outer diameter, OD4, that is greater than ID2 and less than or equal to OD3;

c. a fourth cylindrical spacer slideably mounted on the body and comprising a distal end adjacent the fourth dampening member and a proximal end opposite the distal end, said spacer comprising a central longitudinal passageway extending the entire length of the spacer and having an inner diameter, ID3, sized to slideably fit over the body, said fourth spacer having a length in the range of ⅛ to ⅝ inches, said spacer comprising at least one slot in each of its distal and proximal ends;

d. a fifth tungsten carbide cutter slideably mounted on the body and comprising a central longitudinal channel extending the entire length of the fifth cutter and having an inner diameter, ID1, sized to slideably fit over the body, said fifth cutter further comprising a distal end region comprising a cutting lip having an outer diameter, OD2, and a proximal end region having an outer diameter, OD3, that is less than OD2, such that the outer surface of the fifth cutter forms an angle with respect to the outer surface of the body in the range of 1° to 45°, said fifth cutter being positioned such that its distal end region is adjacent the proximal end of the fourth spacer;

e. a fifth elastomeric vibration dampening member slideably mounted on the body and positioned adjacent the proximal end of the fifth cutter and having an inner diameter, ID2, substantially equivalent to ID1, and an outer diameter, OD4, that is greater than ID2 and less than or equal to OD3;

f. a fifth cylindrical spacer slideably mounted on the body and comprising a distal end adjacent the fifth dampening member and a proximal end opposite the distal end, said spacer comprising a central longitudinal passageway extending the entire length of the spacer and having an inner diameter, ID3, sized to slideably fit over the body, said fifth spacer having a length in the range of 1/8 to 5/8 inches, said spacer comprising at least one slot in each of its distal and proximal ends;

g. a sixth tungsten carbide cutter slideably mounted on the body and comprising a central longitudinal channel extending the entire length of the sixth cutter and having an inner diameter, ID1, sized to slideably fit over the body, said sixth cutter further comprising a distal end region comprising a cutting lip having an outer diameter, OD2, and a proximal end region having an outer diameter, OD3, that is less than OD2, such that the outer surface of the sixth cutter forms an angle with respect to the outer surface of the body in the range of 1° to 45°, said sixth cutter being positioned such that its distal end region is adjacent the proximal end of the fifth spacer;

h. a sixth elastomeric vibration dampening member slideably mounted on the body and positioned adjacent the proximal end of the sixth cutter and having an inner diameter, ID2, substantially equivalent to ID1, and an outer diameter, OD4, that is greater than ID2 and less than or equal to OD3; and i. a sixth cylindrical spacer slideably mounted on the body and comprising a distal end adjacent the sixth dampening member and a proximal end opposite the distal end, said spacer comprising a central longitudinal passageway extending the entire length of the spacer and having an inner diameter, ID3, sized to slideably fit over the body, said sixth spacer having a length in the range of ⅛ to ⅝ inches, said spacer comprising at least one slot in each of its distal and proximal ends.

20. The carbide wire blade of claim 19, further comprising an elastomeric distal vibration dampening member slideably mounted on the body and placed between the distal end of each cutter and the proximal end of each spacer.

21. The carbide wire blade of claim 19, wherein each cutter comprises sintered tungsten carbide.

* * * * *